United States Patent [19]

Bailey

[11] Patent Number: 4,858,590
[45] Date of Patent: Aug. 22, 1989

[54] FLEXIBLE HEAT TRANSFER PAD

[76] Inventor: Samuel Bailey, 5550 Williamsburg Way, Fairfield, Ohio 45014

[21] Appl. No.: 166,541

[22] Filed: Mar. 10, 1988

[51] Int. Cl.$^4$ .......................... F24C 3/00; F24H 7/00; A05B 3/68
[52] U.S. Cl. ................................ 126/39 H; 126/400; 219/462; 219/464; 165/185
[58] Field of Search ...................... 126/39 H, 400, 211, 126/220, 221, 214 C; 219/462, 464, 459, 530; 165/185

[56] References Cited

U.S. PATENT DOCUMENTS

| | | |
|---|---|---|
| 1,386,303 | 8/1921 | Armstrong . |
| 3,083,286 | 3/1963 | Swetlitz ........................ 126/400 X |
| 3,569,672 | 3/1971 | Hurko ............................... 126/400 |
| 3,845,273 | 10/1974 | Hurko ............................ 165/185 X |
| 4,634,841 | 1/1987 | Laughrey . |

Primary Examiner—Larry Jones
Attorney, Agent, or Firm—King & Schickli

[57] ABSTRACT

A flexible heat transfer pad for positioning on an electrical coil of the heating element on a stove. The pad includes two embossed metal plates with a metal alloy body sandwiched in between the two plates. The center section of the pad defined by the alloy body closely corresponds to the area of the electrical coil. An annular extension around the body includes opposite circular recesses for reinforcement of the pad. The upwardly extending recess forms a drip ring to confine any inadvertent overflow from a pan on the pad. A depending skirt around the drip recess extends over the rim of the heating element and substantially closes the stove opening. A liquid metal alloy body is preferably INDALLOY, a tin and bismuth alloy combination that melts at 281° F. with no appreciable expansion or contraction during phase change or temperature transition. Other alloys or materials with similar properties can be used as a substitute material for the body as long as the melting point is approximately 140° F. or higher. Upon melting at the elevated temperature, the pad becomes flexible so as to conform to the contour of the heating element coil, as well as the bottom of the pan on top. This provides maximum heat transfer efficiency.

6 Claims, 1 Drawing Sheet

FLEXIBLE HEAT TRANSFER PAD

TECHNICAL FIELD

The present invention relates generally to a heat transfer apparatus and, more particularly, to a heat transfer pad adapted to be mounted on a coiled electrical resistance heating element, as found on electric stoves, to facilitate improved heat transfer.

BACKGROUND OF THE INVENTION

Electric ranges are commonly used in a great many homes in the United States and abroad. The typical electric range includes a stove top having four or more coiled electrical resistance heating elements, commonly known as burners or burner elements. During use, cooking vessels such as pots or pans are placed directly on the coiled burner element. The burner element is then set to the desired temperature, and the cooking process begun. Although generally effective, this standard configuration is not without its disadvantages. More specifically, significant heat is lost through contact resistance between the burner element and cooking vessel.

As a practical example of this type of heat loss, a kettle about to boil can be induced into boiling by actively pressing the kettle downwardly onto the burner element. While thus engaged, the kettle boils. When released, the boiling action stops. It can be seen that pressing the kettle downwardly forces it into tight engagement with the burner element overcoming the contact resistance. This contact resistance arises as a result of incomplete contact between the burner element and the cooking vessel. More specifically, air pockets form in the areas of incomplete contact. These air pockets act as effective thermal insulators, preventing efficient conduction of heat. The practical disadvantage of this contact resistance is greater use of energy through the requirements of longer cooking times and cooking at higher temperatures to achieve the desired cooking result.

U.S. Pat. No. 1,386,303 to Armstrong discloses a heat conducting pad placed on a burner element of a stove. The pad is filled with metallic pieces which are about the size of ordinary shot. In use, the weight of the cooking vessel forces some degree of conformity between the vessel and burner, increasing heat transfer somewhat. Although the pad generally conforms to the burner element and cooking vessel, effective heat transfer is limited to the paths defined by physical contact of the metallic shot. Additionally, because the pad is not homogeneous, it necessarily contains air. The air pockets thus contained form thermal insulators, thereby reducing the effectiveness of the heat conducting pad.

U.S. Pat. 3,845,273 to Hurko discloses a composite metal burner unit having a smooth upper surface. Although this device may increase heat transfer somewhat, the upper plate is not flexible so as to conform to the contours of the cooking vessel. Additionally, the device must be built into the stovetop and is not easily retrofitted onto units already in use.

A need exists, therefore, for a flexible heat transfer pad designed to be installed on the coiled burner element of a stove. Such a device would be flexible to conform to the contours of the burner element and the cooking vessel during use, thereby greatly increasing overall heat transfer. Such a device would be simple, self-contained, economical and easily installed on stoves already in use.

SUMMARY OF THE INVENTION

It is therefore a primary object of the present invention to provide a flexible, heat transfer pad overcoming the limitations and disadvantages of the prior art.

Another object of the present invention is to provide a flexible, heat transfer pad to improve heat conduction between stovetop burner elements and cooking vessels.

Yet another object of the present invention is to provide a flexible, heat transfer pad which conforms during cooking to the contours of the burner element and the bottom surface of the cooking vessel.

Still another object of the present invention is to provide a flexible, heat transfer pad which is easily installed or removed from burner elements of new stoves and stoves already placed in service.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a flexible heat transfer pad provides improved heat transfer between a stovetop burner element and the cooking vessel. During cooking, the heat transfer pad conforms to the surfaces of the cooking vessel and the burner elements thereby providing optimum heat transfer.

The preferred embodiment of the heat transfer pad selected to illustrate the invention includes upper and lower metallic plates which are flexible, and thus well suited to conform to the contours of both the burner element and the cooking vessel during cooking.

According to an important aspect of this invention, a metallic alloy body is securely retained or sandwiched between the upper and lower plates. The alloy body is circularly shaped and sized to conform to the dimensions of standard burner elements. This alloy body melts at substantially low cooking temperatures. Upon melting of the alloy body, the pad yields to conform to the contours of the burner element and the cooking vessel. This substantially reduces contact resistance, thereby dramatically improving heat transfer characteristics.

The upper and lower plates are embossed with conforming contours so as to mate with one another, simplifying assembly, and further serving to improve heat transfer. The upper and lower plates combine to form an annular extension around the alloy body. This annular extension includes opposite (upper and lower) circular recesses. These recesses are defined by concentric ribs to thereby reinforce the pad. The upwardly extending recess also forms a drip ring to confine inadvertent drips or spills. A central upwardly extending recess is provided in the upper plate and provides additional concentric ribs to further strengthen the pad.

A depending skirt extends outwardly and downwardly from the drip ring and when the pad is installed, extends so as to substantially close the stove opening. This depending skirt also serves to reinforce the pad, and to keep the burner covered, and thus cleaner. This feature also greatly reduces the heat losses due to convection around the perimeter of the pad.

The depending skirt terminates in a lower lip. This lower lip is formed by rolling or bending a portion of the upper plate back and over the lower plate, thereby securely retaining the plates together. Advantageously, this allows for the pad to be assembled without using separate retaining means such as rivets, brazing material or the like. This minimizes the cost of fabrication and helps keep the thermal mass to a minimum, reducing the amount of heat energy required to bring the pad up to the appropriate cooking temperature.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawing and descriptions will be regarded as illustrative in nature and not as restrictive.

BRIEF DESCRIPTION OF THE DRAWINGS

The accompanying drawing incorporated in and becoming a part of the specification, illustrates several aspects of the present invention and together with the description serves to explain the principles of the invention. In the drawing.

Reference will now be made in detail to the present preferred embodiment of the invention, an example of which is illustrated in the accompanying drawings.

DETAILED DESCRIPTION OF THE INVENTION

Figure 1:
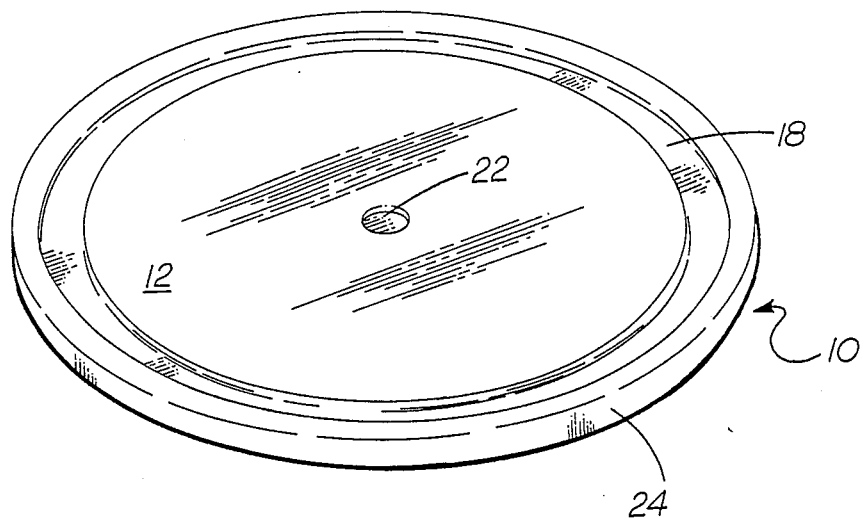
FIG. 1 is a perspective view of the heat transfer pad of the present invention.
Figure 2:
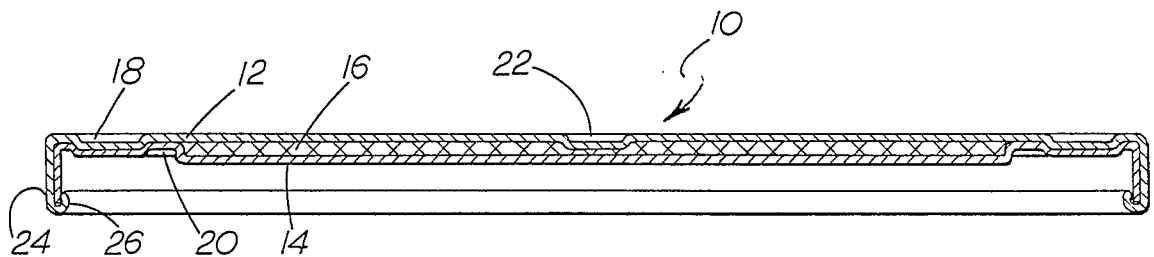
FIG. 2 is a cross-sectional view of the flexible heat transfer pad of the present invention showing the alloy body retained within the upper and lower plates.

Reference is now made to FIGS. 1 and 2 showing the flexible heat transfer pad of the present invention particularly adapted to be mounted on the coiled burner element of a stove. During cooking, the pad yields to conform to the contours of the burner element and the cooking vessel, thereby dramatically improving heat transfer characteristics.

As shown in FIG. 1, the heat transfer pad 10 is circular, and is designed to cover the burner element of ordinary cooking stoves.

Figure 3:
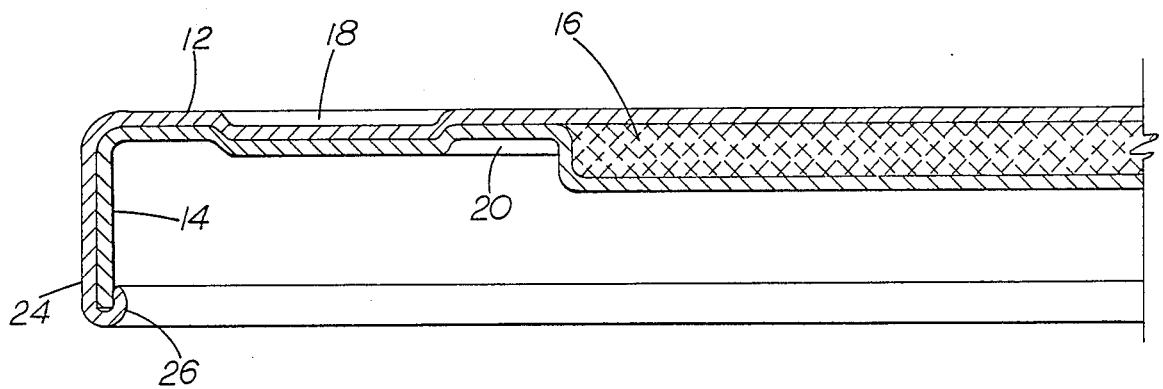
FIG. 3 is an enlarged, partial cross-sectional view of the flexible heat transfer pad of the present invention.

As shown in FIGS. 2 and 3, the pad 10 includes upper and lower plates 12 and 14 respectively. In the illustrated embodiment, plates 12 and 14 are fabricated of thin copper; preferably ASTM B152ALLOY 110; 0.0216" thick. The plates formed of this material are flexible, but have sufficient stiffness to give firm shape to the pad 10. The thickness of the plates 12, 14 is selected so as not to cause rigidity that could hinder the objective of conforming to the surfaces with which they are placed in contact when the pad is heated.

According to an important aspect of this invention, a metallic alloy body 16 is sandwiched between and substantially fills in the cavity formed between upper and lower plates 12 and 14 respectively. Alloy body 16 is circularly shaped and sized to conform to the burner element, and melts at low cooking temperatures. Once the alloy body 16 has melted, the pad 10 is relatively free to conform to the surfaces of the burner element and the cooking vessel. However, the body 16 maintains the separation between the two plates, and thus stiffens the pad sufficiently to provide the proper support to the cooking vessel.

In the preferred embodiment, the alloy body 16 is fabricated of a metallic alloy containing 42% tin and 58% bismuth. This alloy melts at 281° F. and exhibits substantially no expansion or contraction during phase changes or temperature transitions. This desirable characteristic allows the pad 10 to be tightly constructed and hermetically sealed, requiring no additional room and associated air space for expansion or contraction of the alloy body 16. This provides improved heat transfer capability, because any internal voids would tend to act as thermal insulators. This tin/bismuth alloy is known by the trademark INDALLOY, and is available from Indian Corporation of America, Utica, New York. Although INDALLOY was chosen for the preferred embodiment, other alloys exhibiting the same characteristics can be used, provided the alloy melts at substantially low cooking temperatures (140° F. or above).

The upper and lower plates 12, 14 respectively extend beyond the diameter of the alloy body 16. Contained within this annular extension are oppositely aligned circular recesses 18 and 20. Recesses 18, 20 are formed by concentric ribs (see FIG. 2) provided to reinforce the pad and add sufficient strength to guard against overflexing. Upper recess 18 also serves as a drip ring to contain inadvertent drips or spills from the cooking operation. Similarly, center recess 22 is provided to help strengthen the pad 10 in the area of the alloy body 16. Additionally, recess 22 serves to alleviate some of the thermal stresses within the copper plate 12 during heating and cooling. This allows the pad to undergo rapid temperature changes while maintaining a substantially flat upper surface.

Depending skirt 24 of the upper plate 12 extends from the upper recess 18, and when the pad 10 is installed, the skirt 24 serves to cover the burner element and substantially close the stove opening. This improves the appearance of the installed pad 10, helps keep the burner clean and also serves to greatly reduce heat losses due to convection. This assures that the heat generated by the burner element is used for cooking and not for heating the surrounding atmosphere.

Depending skirt 24 terminates in a rolled, annular lip 26. The lip 26 is tightly crimped over the bottom edge of the lower plate 14 and serves to securely retain upper and lower plates 12 and 14 together (see FIG. 3). Advantageously, this method of retention allows for the pad 10 to be assembled without using rivets, brazing material or the like. This simplifies assembly, thus lowering the fabrication cost and serves to minimize thermal mass. The intermeshing ribs forming the recesses 18, 20 are of course sealed against each other once the lip 26 is formed. An annular tortious path (FIG. 3) is thus provided preventing the escape of any of the alloy metal 16 at any time when heated and in a liquid state.

The outer surface of upper plate 12 is plated with a thin layer of chrome plate. Chrome provides an aesthetically pleasing surface, and because it is a hard material, protects the softer copper plate 12, substantially preventing burning, pitting and the like. The chrome plating is preferably 0.0003 inch, ±0.0001 thick.

In summary, numerous benefits result from employing the concepts of the present invention. The heat transfer pad 10 is adapted to be installed over the burner elements of cooking stoves. The pad 10 is flexible and includes an internal alloy body 16 which melts at substantially low cooking temperatures. Upon melting of the alloy body 16, the pad 10 yields to conform to the contours of the burner element and the cooking vessel. Advantageously, this serves to greatly reduce heat losses, improving the efficiency of the stove. This serves to not only reduce cooking times but reduce energy consumption as well.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principals of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

I claim:

1. A flexible heat transfer pad for optimizing heat transfer from an electrical heating element on an electric stove comprising:

upper and lower metallic plates, said plates being sealed together and being thermally conductive; and conducting means retained within said upper and lower places, said conducting means being a metallic alloy which liquifies at relatively low cooking temperatures said conducting means further changing from a solid state to a liquid state with substantially no appreciable expansion or contraction;

whereby said heat transfer apparatus substantially conforms to the contours of said electrical heating element during cooking, optimizing heat transfer.

2. The heat transfer pad of claim 1, wherein said upper and lower plates include oppositely directed annular recesses.

3. The heat transfer pad of claim 1 wherein said conducting means is an alloy of tin and bismuth.

4. The alloy of claim 3, the approximate percentages of tin and bismuth being 42 and 58 percent, respectively.

5. The heat transfer pad of claim 1, the upper plate including a depending skirt, said depending skirt terminating in a lower rolled lip.

6. The heat transfer pad of claim 5, the lower plate including a bottom edge, said lower lip being crimped over the edge to retain the plates together.

* * * * *